June 13, 1950　　　C. O. HERRALA ET AL　　　2,510,976
PRESSURE-GOVERNED REGULATOR
Filed Nov. 19, 1945
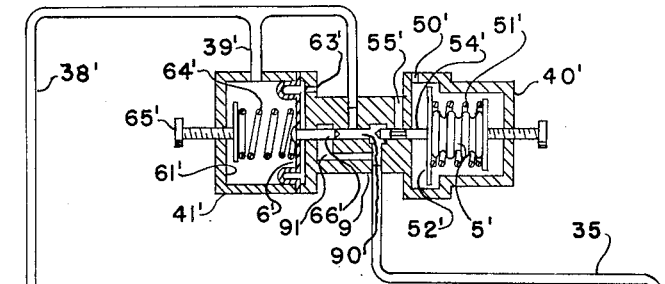
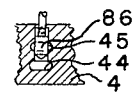
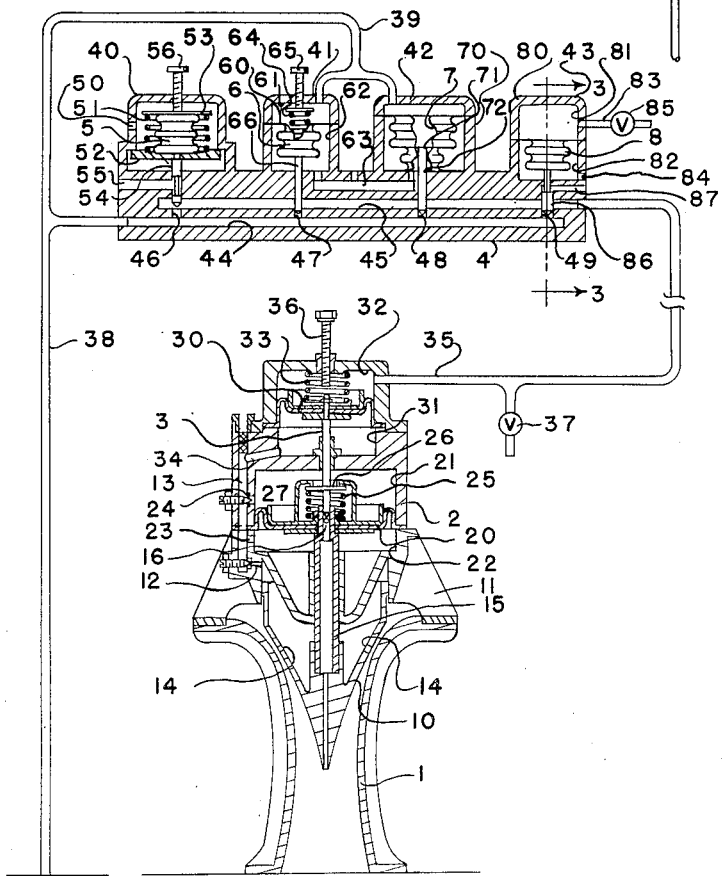
INVENTORS.
Carlo O. Herrala
BY Alfred B. Jepson
Reynolds & Beach
ATTORNEYS.

Patented June 13, 1950

2,510,976

UNITED STATES PATENT OFFICE 2,510,976

PRESSURE-GOVERNED REGULATOR

Carlo O. Herrala, Seattle, and Alfred B. Jepson, near Bellevue, Wash., assignors to Boeing Airplane Company, a corporation of Delaware Application November 19, 1945, Serial No. 629,334

6 Claims. (Cl. 98—1.5)

This invention relates to regulating mechanism for controlling the air pressure within an aircraft cabin, and constitutes an improvement upon devices of the general type represented by the disclosure of Cooper Patent No. 2,307,199.

This device has in common with the Cooper mechanism mentioned above the control of aircraft cabin air pressure by regulating the outflow from it while air is supplied to the cabin at a substantially constant rate from a source of air under pressure. Our device, like that of the Cooper patent, employs an outflow valve, movement of which is effected and regulated by a pneumatic servo device operated by a pressure differential, for example that between cabin air pressure on one side of the servo device pressure-actuated element, and a pressure intermediate cabin air pressure and outflow duct pressure on its other side.

The difference between our device and that disclosed in the Cooper patent resides principally in the mechanism for controlling the pressure difference to which the outflow valve actuating servo device is subjected. Where control mechanism for the servo device of the type disclosed in the Cooper patent is employed, a continual flow of air through such control mechanism is required. It is the principal object of our development to provide static pressure operated booster control mechanism for the servo device which booster control mechanism requires little interchange of air through it to vary the static pressure acting on it. For that reason the ducts interconnecting the booster control mechanism and the pressure pattern control mechanism may be small, and whether use of a long conduit does not retard or alter appreciably the performance characteristics of the system.

By construction of the type disclosed herein the additional object of simplifying generally the pressure controlling mechanism is accomplished. Moreover the accuracy with which such pressure controlling mechanism may operate is improved, and the operational characteristics of the device after actual installation in the airplane may be foretold with accuracy from simple shop tests without duplicating all the duct work in the precise arrangement which may be utilized in the actual aircraft installation.

Also the present mechanism enables adjustments in the type of pressure regulation desired to be effected comparatively readily. Not only can control units be manually regulated independently in a convenient manner, but control units, each operable to effect a different plan of cabin air pressure control, may be added or omitted as desired without requiring alteration of other control units of the mechanism.

Additional advantages inherent in our preferred type of mechanism will be discussed hereafter, although such arrangement is merely illustrative of one operative embodiment of the invention.

Figure 1 is a somewhat diagrammatic view of the outflow valve and its actuating and control mechanism.

Figure 2 is a somewhat diagrammatic view of a different type of control mechanism, suitable for use in conjunction with the outflow valve and its actuating mechanism shown in Figure 1.

Figure 3 is a sectional view on line 3—3 of Figure 1.

Mechanism for supplying air under pressure to the aircraft cabin has not been disclosed, but it will be understood that in order to obtain proper ventilation it will be desirable to supply continuously to the cabin, and at a substantially constant rate, air under a pressure sufficiently high to maintain within the cabin the desired excess of pressure over atmospheric pressure at all altitudes. The pressure of the air within the cabin will then be determined by the rate at which air flows out of it through the outlet 1. The outflow is dependent upon the degree of differential between the cabin air pressure and the atmosphere and the extent of opening of the outflow valve 10, so that adequate control of the cabin air pressure can be effected by regulation of the latter factor. Air may enter the outlet 1 through ports 11 communicating directly with the cabin.

The problem, then, is to regulate the position of outflow valve 10 to maintain the desired pressure condition within the cabin as the altitude of the aircraft varies. While reference has been made above to Cooper Patent No. 2,307,199, as disclosing mechanism representative of the general type to which our invention pertains, the servo device and outflow valve arrangement shown in Figure 1 of the present drawings more nearly resembles that disclosed in Figure 1 of Cooper and Jepson Patent No. 2,450,881, issued October 12, 1948 for Pressure cabin control, and in Figure 1 of their Patent 2,419,707, issued April 29, 1947 for Ratio attachments for pressure cabin controls.

The general plan of cabin air pressure variation which the control mechanism is capable of accomplishing is more similar to that illustrated in Figure 5 of the Cooper and Jepson Patent No. 2,419,707, mentioned above. It may effect control of the cabin air pressure as the aircraft ascends, first, at pressures progressively decreasing at a rate substantially the same as the rate of decrease in atmospheric pressure, up to a predetermined altitude, for example 8000 feet; second, at a substantially constant pressure up to a further predetermined altitude, for example 30,000 feet; third, at pressures decreasing at a rate such that the difference between cabin air pressure and ambient atmospheric pressure remains constant up to another predetermined altitude, for example 40,000 feet, and finally at pressures decreasing more rapidly than the rate of decrease in atmospheric pressure, such that the ratio of cabin air pressure to atmospheric pressure remains substantially constant.

In addition the controlling mechanism is capable of limiting the rate at which the pressure in the aircraft cabin changes under certain conditions, so that such rate of pressure change will not exceed a predetermined value, which is generally comparable to the result effected by the mechanism disclosed in the aforesaid Cooper Patent No. 2,307,199.

As in the mechanism shown in Figure 1 of Cooper and Jepson Patent No. 2,419,707, the upper side of the outflow valve 10 is in communication with a source of air under relatively high pressure, by way of the regulatable aperture 12. Such aperture communicates with the duct 13 which opens directly to the aircraft cabin, representing a convenient high pressure region. Air flows out of the chamber above the valve through ports 14 communicating through the valve wall with the Venturi throat formed between the valve and the outlet 1.

The pneumatic servo device which actuates the outflow valve is superposed above it in casing 2, and the pressure actuated element is shown as diaphragm 20 dividing the casing 2 into an upper chamber 21 and a lower chamber 22, illustrative of one type of pressure actuated element. Such lower chamber is in direct communication with a relatively high pressure region, such as the aircraft cabin, by way of duct 13 and the unrestricted port 23. Communication between the upper chamber 21 and a relatively high pressure region is restricted, however, through the regulatable port 24 opening into duct 13.

In previous pneumatic servo devices it has been the practice to provide an outlet from the upper chamber by different routes according to the particular pattern of cabin air pressure regulation desired at various altitudes. Our control mechanism simplifies the structure by providing only a single outlet from the upper servo-device chamber 21, which is shown to be through the hollow valve stem 15, directly to the outflow or atmosphere end of the valve body. It will be noted that in Figure 1 of the Cooper and Jepson Patent No. 2,419,707, the hollow valve stem served as an alternate outlet for the upper servo device chamber. In the instant mechanism it serves as the sole outlet from chamber 21.

The wall of the upper end of hollow stem 15 has in it an aperture 16 spaced downward somewhat from its upper end. The lower end of a valve rod enters the upper end of the hollow stem and fits snugly within it. By relative reciprocation of such rod and the hollow stem the rod will close the aperture 16 to a greater or lesser extent, so that the size of effective aperture opening may be varied by the amount of projection of such valve rod into the upper end of the stem. A spring 25 reacting between the diaphragm 20, to which the valve stem 15 is attached, and a plate 26 mounted on the upper end of the valve rod, tends to move such rod and the valve stem relatively in a separating direction, to expose the largest possible area of port 16 below the rod end. Such outward movement of the rod is limited by engagement of its plate 26 with a cage 27 encircling spring 25. This cage is suitably apertured for flow of air from the chamber 21 proper through the port 16 to the interior of valve stem 15.

Closing movement of valve 10 is effected by the action of the booster control mechanism to depress a control rod 3, engageable with the upper side of plate 26, in the following manner. As the exposed area of port 16 is reduced by such movement, the escape to the atmosphere through hollow valve stem 15 of air which enters the upper chamber 21 of the servo device through the metered port 24 directly from the aircraft cabin or other proximate pressure source is restricted to a greater extent, and consequently the air pressure in such chamber will increase. The force exerted on the upper side of diaphragm 20 by such increased air pressure in chamber 21 and spring 25 will overcome the upward pressure on the under side of such diaphragm of air in the lower chamber 22, and consequently it will be depressed. Since the stem 15 of valve 10 is secured to such diaphragm the valve will be moved toward closed position to an extent equal to the diaphragm movement.

Alternatively if rod 3 is raised spring 25, reacting between diaphragm 20 and the under side of plate 26, will lift the valve pin to uncover port 16 farther. Air can therefore escape more freely from the upper chamber 21, and pass through stem 15 directly to the atmosphere at a rate faster than air can enter this chamber through restricted port 24. Consequently the air pressure in it will drop, thus increasing the air pressure differential on diaphragm 20, tending to raise it, which will draw upward valve stem 15 to lift the outflow valve 10. Each time the control rod 3 is moved upward through an increment spring 25 will lift plate 26 to restore its engagement with the end of such rod, until such plate movement is arrested by its engagement with the cage 27. The valve rod is thus moved upward progressively corresponding to the movement of the booster control mechanism rod 3.

It will be understood, therefore, that the degree of opening of valve 10 may be regulated simply by moving control rod 3 upward or downward, and such rod movement may be effected by regulating the static air pressure differential acting on opposite sides of diaphragm 30, which is carried by the upper end of such rod. The air pressure in chamber 31 below this diaphragm, to which its under side is exposed, is normally at a pressure higher than the static air within the upper chamber 32, to which the upper side of the diaphragm is exposed. The difference in these two air pressures is balanced by the downward pressure exerted by spring 33 and the compression stresses in rod 3.

The movement of outflow valve 10 is thus primarily dependent upon the static air pressure differential acting on diaphragm 30. The lower chamber 31 communicates substantially unrestrictedly with a region at a relatively high pressure, for example the aircraft cabin, by way of a large port 34 leading into duct 13. It is to be noted particularly that there is only one port in each of chambers 31 and 32, and that there is no transference of air between them. Consequently no flow of air through either of such chambers occurs, but the air pressure differential acting on diaphragm 30 is solely the result of a difference in the static pressures within these two chambers. Such difference may be altered to control movement of the booster control rod 3, and in turn of the outflow valve in the manner desired, by regulating one only of these static pressures with the control mechanism. In the construction shown such mechanism acts to vary the static air pressure in conduit 35 connected to static air pressure chamber 32.

The opening movement of the valve may be limited, or its opening even entirely prevented, by screwing downward the desired amount screw 36, which is threaded in casing 2 in a position above and in alignment with the valve control rod 3. Moreover our booster control mechanism may be rendered incapable of regulating the position of valve 10 by opening valve 37, which will establish direct communication between duct 35 and the aircraft cabin. Such operation will immediately equalize the air pressures in chambers 31 and 32 acting on opposite sides of diaphragm 30, whereupon the resilience of spring 33 will urge rod 3 downward to close ports 16. This will enable the air pressure in chamber 21 above diaphragm 20 to increase until it approaches the value of the air pressure in the lower chamber 22. Especially because of the higer pressure acting on the upper side of valve 10 than on its lower side, such valve will consequently be moved to closed position, or substantially to such position.

During normal operation of our pressure regulating control mechanism the pressure in conduit 35, and consequently in the upper chamber 32 of the booster control mechanism in the valve actuator casing 2, will be lower than cabin air pressure. The side of the pressure pattern control mechanism opposite that connected to conduit 35 communicates, by way of a conduit 38, with a region at a pressure substantially lower than cabin air pressure, at least under cabin supercharged conditions. Such low pressure region may be, for example, the ambient atmosphere. A branch conduit 39 communicating with conduit 38 may supply to various units of the pressure pattern control mechanism air at ambient atmospheric pressure, or at a value which is proportional to and varies with atmospheric pressure.

The sole function of the pressure pattern control mechanism 4 is to regulate the communication between conduit 35 and a low pressure region, such as conduit 38, or a high pressure region, such as the aircraft cabin, for the purpose of raising or lowering the air pressure in chamber 32 of the booster control mechanism, to move the outflow valve 10 as necessary to maintain the desired cabin air pressure. Such pressure pattern control mechanism incorporates several control units, which are arranged so that some of them may override others.

At the left of the pressure pattern control mechanism 4 as seen in Figure 1 is an absolute pressure unit 40 which tends to maintain the aircraft cabin air pressure substantially constant. When the differential of cabin air pressure over atmospheric pressure approaches a predetermined safe limit, the differential pressure unit 41 comes into operation to negative the controlling action of the absolute pressure unit 40. When the altitude of the aircraft has increased to such an extent that the ratio of cabin air pressure to atmospheric pressure tends to increase above a predetermined value, the ratio control unit 42 in turn overrides the differential pressure control unit, operating the valve actuator, as the altitude of the aircraft increases further, to effect reduction in the cabin air pressure adequate to maintain such predetermined ratio of cabin air pressure to atmospheric pressure. By the operation of such units the manner in which the cabin air pressure varies with changes in altitude is established, and hence they are termed pressure pattern control units.

If at any time the pressure of the air in the cabin should tend to decrease too rapidly during ascent of the aircraft before the cabin pressure has decreased to the value of the constant cabin pressure maintained by the unit 40, or if the pressure of the air in the cabin should tend to increase at too rapid a rate when it is at a value above ambient atmospheric pressure and the aircraft is descending, the rate-of-pressure-change unit 43 will control the valve actuator to move outflow valve 10 for decreasing the rate at which the cabin air pressure tends to change under such conditions.

The pressure pattern control mechanism includes a base block having extending lengthwise through it two parallel header passages 44 and 45, adapted to be interconnected by any one of several cross apertures 46, 47, 48, and 49, corresponding, respectively, to the absolute pressure control unit 40, the differential pressure control unit 41, the ratio control unit 42, and the rate-of-pressure-change control unit 43. The relative order in which such units are arranged along these passages is immaterial. Passage 44 is connected to conduit 38 leading to the relatively low pressure region, such as atmosphere, while passage 45 is connected to conduit 35, communicating with the upper chamber 32 of the outflow valve actuator booster control mechanism, which may be located remote from the pressure pattern control mechanism to which it is connected by such conduit 35.

In discussing the operation of the control mechanism generally it should be kept in mind that a decrease in pressure in conduit 35, such as by increasing the communication between such conduit and conduit 38, will result in an opening movement of the cabin outflow valve 10, causing a consequent reduction in aircraft cabin air pressure or a less rapid increase in it. Conversely, an increase in pressure in conduit 35, such as effected by establishing communication between it and a region of relatively high pressure as compared to the pressure in conduit 38, will result in movement of the outflow valve 10 toward closed position, which will increase the air pressure in the aircraft cabin or retard its decrease.

The absolute pressure control unit 40 includes a pressure sensitive element in the form of evacuated bellows 5, which is exposed to cabin air pressure entering the unit by way of port 50. The pressure of the air within the aircraft cabin normally tends to collapse such bellows against the expansive action of spring 51, to draw upward the lower movable head 52 of the bellows toward the normally stationary head 53. Such upward movement of head 52 is limited by its engagement with suitable stop shoulders formed in the casing which establish its limiting position, as shown in Figure 1.

Pin 54 carried by the movable head 52 of bellows 5 and disposed axially of the bellows, slides snugly in an aperture in the pressure control mechanism base which is aligned with the cross aperture 46. Communicating with the bore in which such pin slides, and disposed above passage 45, is a duct 55 opening into the aircraft cabin. Pin 54 has a reduced intermediate portion of a length greater than the distance between such duct and passage. When the pin is projected downward a given distance communication will be established between duct 55 and passage 45, and upon further downward movement the pin tip will close cross aperture 46. The enlarged tip of the pin should be short enough so that it cannot bridge passage 45 when bellows 5 is in its pressure controlling position, but may close cross aperture 46 and duct 55 only alternatively. When bellows head 52 is in its upper limiting position the enlarged tip of pin 54 closes duct 55 and is withdrawn from aperture 46.

As long as the air pressure within the aircraft cabin is sufficiently high to hold bellows 5 collapsed far enough to prevent the lower end of pin 54 from plugging aperture 46, conduit 35 will be in communication with conduit 38 through passages 44 and 45 and such aperture, thus maintaining a low pressure in chamber 32 of the valve actuator equal to that in conduit 38, which creates a pressure differential on its diaphragm 30 tending to open out-flow valve 10. Until bellows 5 expands farther, therefore, the aircraft cabin will be maintained at substantially ambient atmospheric pressure, or slightly above.

As the cabin air pressure drops during climb of the aircraft the air pressure on bellows 5 will be relieved progressively until it begins to expand and move pin 54 downward. Eventually such pin movement will be sufficient to dispose its tip in passage 45 and open duct 55 to passage 45. Air flowing from the cabin into this passage through such duct may still flow to atmosphere through cross aperture 46, but will increase the pressure in the passage and chamber 32. When the pin has moved downward sufficiently to plug such aperture and sever communication between conduit 38 and conduit 35 the pressure in such chamber will rise to cabin pressure. An increase in air pressure in the upper chamber 32 of the booster control mechanism casing thus produced will effect closing movement of outflow valve 10 a greater or lesser extent, depending upon the degree of such pressure increase, and will initiate supercharging or pressurizing of the aircraft cabin.

Because, as stated, the length of the enlarged tip of pin 54 is slightly less than the width of passage 45, when bellows 5 has expanded to the predetermined length corresponding to the cabin air pressure which it is desired to maintain, both duct 55 and cross aperture 46 will be open somewhat, so that air will flow from one to the other around the valve tip. If the cabin air pressure should decrease slightly, bellows 5 will expand to move pin 54 downward for increasing communication between duct 55 and header passage 45, simultaneously throttling aperture 46, to increase the pressure in conduit 35 and chamber 32, for effecting movement of outflow valve 10 toward closed position. The outflow of air from the cabin will thus be reduced, resulting in an increase in cabin air pressure, and such pressure increase will compress bellows 5 again. Such contraction of the bellows will draw pin 54 upward again to constrict communication between duct 55 and passage 45, and to increase the opening through aperture 46 to the latter passage from duct 38.

Conversely, if the air pressure in the cabin should increase somewhat, the resulting contraction of the bellows by such pressure will withdraw the tip of pin 54 farther from cross aperture 46 and close duct 55 somewhat. Air will then flow more freely from passage 45 through such aperture to passage 44 and conduit 38, thus reducing the pressure in conduit 35 and the static air pressure chamber 32 of the booster control mechanism to effect an opening movement of valve 10. As the valve opens the outflow of air from the cabin will increase, so that the cabin air pressure will drop somewhat. Such pressure decrease will be reflected in a slight expanding movement of bellows 5, sufficient to move the enlarged tip of pin 54 again into its intermediate position disposed wholly in passage 45.

By such operation the aircraft cabin air pressure may be maintained constant within a very small tolerance by the action of the absolute pressure control unit 40. The particular average cabin air pressure maintained is governed by the pressure which permits extension of bellows 5 sufficiently so that the enlarged tip of pin 54 will lie in passage 45. The cabin air pressure to be maintained can therefore be altered quite readily merely by adjusting the length of bellows 5 required to effect such disposition of pin 54 so that its tip frees both cross aperture 46 and duct 55. Such adjustment may be effected by shifting the bellows supporting head 53 relative to passage 45, such as by rotation of the adjusting screw 56. Movement of such head toward the passage will increase the cabin air pressure which the control tends to maintain, while withdrawal of the head will decrease such cabin air pressure. Such alternation of the constant value of cabin air pressure automatically varies correspondingly the altitude at which supercharging of the cabin will be initiated.

As the aircraft continues its ascent while the pressure of the air in the cabin is maintained at a constant value by the absolute pressure control unit, an altitude will be reached eventually at which the differential between cabin air pressure and ambient atmospheric pressure exceeds a predetermined critical safe value, which, for example, may be 12 inches of mercury or 6 pounds per square inch. At that time the cabin air pressure may be allowed to decrease at a rate equal to or greater than the rate of decrease in atmospheric pressure as the aircraft continues to ascend. If air under pressure can be supplied to the cabin at a sufficiently high compression ratio, it may be possible to maintain the differential between cabin air pressure and atmospheric pressure constant over a substantial altitude range, which is the function of unit 41.

When such critical maximum differential of cabin air pressure over atmospheric pressure has been reached the differential pressure control unit 41 overrides the absolute pressure control unit 40 and prevents the latter unit from maintaining a constant cabin air pressure as the atmospheric pressure continues to decrease. The unit 41 includes a pressure sensitive element such as bellows 6 supported by a diaphragm 60 which divides the unit into an upper chamber 61, to which the interior of the bellows is exposed, and a lower chamber 62, to which the exterior of the bellows is exposed. The upper chamber is in direct communication with the atmosphere through conduits 39 and 38, whereas the lower chamber is under the same pressure as the aircraft cabin because of the communication between them through duct 63.

Preferably bellows 6 is of the type which tends to contract, in which event its contractile resilience may be counteracted by the resilience of a compression spring 64 housed in the upper chamber and reacting between the upper wall of the unit and the interior of the bellows. The force exerted by the spring is sufficient to exceed the contraction force of bellows 6 by an amount equal to the collapsing pressure which the desired differential of cabin air pressure over atmospheric pressure would exert on the bellows. Pin 66, carried by the bellows and guided in a bore of the control mechanism base, will extend downwardly, when the bellows are in expanded condition, just sufficiently to close the cross aperture 47 between the low pressure passage 44 and the booster control mechanism passage 45.

As long as the pressure of the air in the aircraft cabin, and consequently in chamber 62 of the differential pressure control unit, is not sufficiently greater than the atmospheric pressure in chamber 61 of such unit to exceed the differential value for which the control unit is adjusted, the pressure differential acting on bellows 6 cannot collapse it far enough to withdraw pin 66 from the cross aperture 47. When the critical maximum differential of cabin air pressure over atmospheric pressure is at all exceeded, however, the air pressure differential in the unit will contract the bellows against the expanding action of spring 64, which will withdraw pin 66 from aperture 47.

As soon as aperture 47 is opened air will flow through it from passage 45 to passage 44, thus lowering the static pressure in the upper compartment 32 of the booster control mechanism and inducing opening movement of outflow valve 10. Bellows 5, tending to maintain a constant air pressure in the cabin, will expand as the cabin pressure decreases, its movement being sufficient to shift pin 54 for establishing communication between duct 55, communicating with the cabin, and passage 45. Despite admission of high pressure air from the cabin to passage 45, however, the pressure in such passage, and consequently in conduit 35, will drop below cabin pressure, for the air thus entering passage 45 will flow on through aperture 47 to passage 44 and conduit 38, from which it will be discharged to the atmosphere. The decreased pressure in conduit 35 and chamber 32 will cause the booster control mechanism to operate the valve actuating servomotor to open outflow valve 10 sufficiently to reduce the cabin pressure enough to prevent the differential of cabin pressure over atmospheric pressure exceeding the desired critical value, even though atmospheric pressure may continue to drop because of further ascent of the aircraft.

The degree of pressure differential to be maintained by the differential pressure control unit 41 may be varied by adjustment of screw 65. As it is rotated to increase the pressure of spring 64 on bellows 6 a greater differential of cabin air pressure over atmospheric pressure will be required to collapse the bellows sufficiently to withdraw pin 66 from aperture 47 for initiating operation of the differential unit. Conversely, if screw 65 is rotated to decrease the force exerted by spring 64 on the bellows, the unit will permit the occurrence of only a lesser differential of cabin pressure over atmospheric pressure.

As a matter of fact, screw 56 of the absolute pressure unit 40 could be turned down sufficiently far to maintain sea level pressure in the aircraft cabin until the atmospheric pressure had dropped enough to create the predetermined critical maximum differential between it and the cabin air pressure. At that time the differential pressure control unit 41 would begin operating. It will be evident, therefore, that the action of the differential pressure control unit is not affected by the value of constant cabin air pressure which the absolute pressure control unit attempts to maintain, whether such pressure be sea level pressure or that at any other altitude. The differential pressure unit will dominate the absolute pressure unit whenever a line representing constant aircraft cabin air pressure intersects a line shaped like that representing atmospheric pressure and spaced from such latter line by a distance representing the desired critical maximum differential between cabin air pressure and atmospheric pressure.

As a practical matter, weight limitations frequently dictate the maximum compression ratio of blowers to be used as the source of compressed air to be supplied to an aircraft cabin. If, at high altitudes, the differential pressure control mechanism should attempt to maintain a cabin air pressure higher than that which can be supplied by the blower, the air in the cabin would stagnate, and the blower delivery would surge in an undesirable fashion. To maintain adequate continual flow of air through the cabin, therefore, it is desirable to provide control mechanism which will effect opening of outflow valve 10 sufficiently to prevent the cabin air pressure reaching a value such that the cabin air pressure to atmospheric pressure ratio will equal the maximum blower compression ratio.

The ratio control unit 42 includes bellows 7 housed in an evacuated casing 70. These bellows are of stepped formation including a section of larger diameter and a section of smaller diameter, such sections being separated internally of the bellows by a partition or diaphragm 71. The ratio of the areas of the two sides of such diaphragm is equal to the critical ratio of cabin air pressure to atmospheric pressure just below the maximum compression ratio of the blower selected to supply air to the aircraft cabin. The side of partition 71 of smaller area is exposed to cabin air pressure entering the smaller diameter section of bellows 7 by way of duct 63. The side of such partition of larger area is exposed to atmospheric pressure communicated to the upper chamber of casing 70 through conduits 39 and 38.

As long as the ratio of cabin air pressure to atmospheric pressure does not exceed the critical ratio, pin 72 carried by partition 71 will project downward sufficiently far to close the cross aperture 48, adapted to communicate between the low pressure passage 44 and the static air pressure conduit passage 45. When the cabin air pressure is sufficiently great and the atmospheric pressure is sufficiently small to produce such critical pressure ratio, however, the larger section of bellows 7 will be collapsed by the cabin air pressure acting on the smaller area side of partition 71, so that pin 72 will be raised to open the cross aperture 48.

Under such circumstances the absolute pressure control unit 40, attempting to maintain a higher cabin air pressure, will position pin 54 so that it closes cross aperture 46 and establishes communication between cabin air pressure duct 55 and passage 45. The differential pressure control unit 41, also tending to maintain a higher cabin air pressure, will position pin 66 to close cross aperture 47. Air entering passage 45 from the cabin through duct 55 cannot act to increase the pressure in chamber 32 of the booster control mechanism to effect closing of valve 10, however, because such air will escape through cross aperture 48 to the low pressure passage 44. This aperture will be opened sufficiently far by withdrawal of pin 72 so that the pressure in conduit 35 will drop below the value which would be maintained in it even by the differential pressure control unit. Thus the ratio control unit overrides both the differential pressure control unit and the absolute pressure control unit when the ratio of cabin air pressure to atmospheric pressure tends to become excessive.

It will be seen that the functioning of the ratio control unit commences under critical pressure ratio conditions irrespective of the value of cabin pressure which the absolute pressure control unit 40 may be set to maintain, or the differential of cabin air pressure over atmospheric pressure for which the differential pressure control unit 41 may be adjusted. In fact, it would not be necessary for a differential pressure control unit to be included in the control mechanism at all, if the absolute pressure control unit were regulated properly with respect to the critical ratio at which the ratio control unit becomes operative, provided that an excessive differential of cabin air pressure over atmospheric pressure would not occur during such operation. In any event the ratio control unit operation will dominate whenever a line representing either constant cabin air pressure, or cabin air pressure decreasing at any selected rate, tends to cross a line representing the ratio of cabin air pressure to atmospheric pressure at which the ratio control unit 42 becomes operative.

When an aircraft equipped with the control mechanism described thus far beings to ascend, the regulating screw 56 of the absolute pressure control unit 40 may be set to maintain a cabin air pressure substantially equal to atmospheric pressure up to a selected altitude, for example 8000 feet. Nevertheless passengers are made uncomfortable by excessively rapid changes in altitude even within such altitude range. Until the altitude for which the absolute pressure control unit is set has been reached, however, stem 54 will continuously remain retracted sufficiently to establish free communication between passages 45 and 44, so that the pressure in the static air pressure conduit 35 will be as low as possible, tending to maintain valve 10 in its fully open position to keep the cabin air pressure always substantially equal to atmospheric pressure.

In order to prevent too rapid a drop in the cabin air pressure under such conditions the rate-of-pressure-change control unit 43 is provided. This unit incorporates bellows 8, which divide the casing 80 in which they are housed into an upper chamber 81 and a lower chamber 82. Since both of the chambers are in communication with the aircraft cabin, the former through an aperture 83 and the latter through a port 84, the bellows will normally be subjected to equal pressures on its opposite sides, so that it will remain in relaxed condition. Aperture 83 is not like port 84, however, but, on the contrary, is a restricted or metering orifice, whereas port 84 is substantially unrestricted. Air can therefore flow between the aircraft cabin and chamber 81 of the rate-of-pressure-change control device in either direction only at a limited rate.

If the pressure of the air in the cabin should tend to drop too rapidly, such as under the circumstances suggested above, the pressure in chamber 82 of the rate-of-pressure-change control unit would drop more rapidly than that in chamber 81, the resulting pressure differential expanding bellows 8. Such movement projects downward the pin 86 carried by the bellows, which normally closes both cross aperture 49, adapted to communicate between passages 44 and 45, and the duct 87, communicating with the aircraft cabin. If such expansion of the bellows becomes excessive, corresponding to an undesirably rapid reduction in aircraft cabin pressure, the pin 86 will be moved downward far enough to establish communication between duct 87 and passage 45. Immediately, therefore, air would flow from the cabin through such duct 87 into that passage, thus increasing the static pressure in conduit 35 somewhat, even though the air would flow through passage 45 and cross aperture 46 into the low pressure passage 44. The increased static pressure in the chamber 32 of the booster control mechanism, equal to that in conduit 35, would effect closing of outflow valve 10 to some extent to reduce the rate of outflow of air from the cabin, thus retarding the drop in pressure within it.

If the aircraft should terminate its ascent or reduce its rate of ascent, the pressure in the chambers 81 and 82 of the rate-of-pressure-change control unit would soon approach equality, so that the pin 86 would return to the position in which it is shown in the drawing, interrupting communication between duct 87 and passage 45. Immediately, therefore, the pressure in static air pressure conduit 35 would drop to equal that of passage 44 and conduit 38, whereupon the outflow valve would again open to its fullest extent to maintain the cabin air pressure substantially equal to atmospheric pressure.

If, during such operation of the rate-of-pressure-change control unit, the ascent of the aircraft should be so rapid that the critical maximum differential pressure at which differential pressure unit 41 is set to function should tend to be exceeded, pin 66 of the differential pressure unit 41 would be withdrawn from cross aperture 47, establishing communication between passages 45 and 44 supplemental to aperture 46. In that event air entering passage 45 through duct 87 from the aircraft cabin would have considerably less effect on the static air pressure in conduit 35, since such higher pressure air would tend to be exhausted to passage 44 through both apertures 46 and 47. While restriction in the rate of decrease of air pressure in the cabin is desirable, the more important consideration, of course, is that the cabin air pressure to atmospheric pressure differential not exceed a safe value, and for that reason the differential pressure control may override the rate-of-pressure-change control under these circumstances.

If the aircraft is descending from an altitude at which the ratio unit 42 or the differential pressure control unit 41 is in control and the air pressure within the cabin should rise at an undesirably rapid rate, the rate-of-pressure-change device will also operate, to retard such pressure increase. Under such conditions aperture 46 would be closed by the tip of pin 54, placing passage 45 in communication with the aircraft cabin through passage 55, aperture 47 would be closed by pin 66, and aperture 48 would be closed by pin 72, so that, but for the rate-of-pressure-change unit, the cabin air pressure would tend to increase at least as rapidly as the increase in atmospheric pressure.

As the rate of increase in cabin air pressure becomes excessive, bellows 8 will be contracted, because the air pressure rises more rapidly in chamber 82 of the rate-of-pressure-change unit than in chamber 81, sufficiently far to withdraw the enlarged head of pin 86 from the cross aperture 49. The communication thus established between passages 45 and 44 will cause the pressure in passage 45, and consequently in chamber 32 of the valve actuating mechanism, to drop, resulting in an opening movement of valve 10. The resulting increased outflow of air from the cabin will, of course, reduce the rate of air pressure rise in it.

If the air pressure in the cabin should tend to rise at a rate faster than desirable during descent of the aircraft below the altitude having a pressure corresponding to that for which the absolute pressure control unit 40 has been set, bellows 8 would be collapsed by increase in pressure above that set for the constant absolute value. The rate of increase in cabin air pressure would not be reduced by the rate of pressure change unit in such case because its only action in the event of excessive pressure rise is to establish communication between passages 45 and 44 by withdrawal of pin 86 from aperture 49 by contraction of its bellows, and these passages would already be in substantially free communication through cross aperture 46. The rate-of-pressure-change unit could therefore not cause the cabin air pressure to be reduced below atmospheric pressure, which would produce an undesirable collapsing pressure on the walls of the aircraft cabin.

The rate of change in cabin air pressure at which the rate-of-pressure-change unit becomes effective can be varied by adjustment of regulating screw 85. This screw moves a valve which alters the size of port 83 to permit transfer of air between chamber 81, open to bellows 82 and the cabin at different rates. Obviously the smaller the effective size of this aperture, the lower the rate of pressure change at which the unit will effect control movement of pin 86, and the greater will be its effect in retarding the change in cabin air pressure under the circumstances described, whether such pressure is increasing or decreasing.

While the operation of our control mechanism has been discussed with relation to the particular type of apparatus shown in Figure 1, as has been mentioned above it is not necessary that all of the units specified be included in the control mechanism, and in any event the arrangement and relationship discussed is largely exemplary. Figure 2 shows control mechanism embodying only an absolute pressure control unit 40' and a differential pressure control unit 41'. This control mechanism, like that of Figure 1, controls the static pressure in the conduit 35 connected to the static air pressure chamber 32 of the booster control mechanism for the pneumatic servomotor operating valve 10, controlling flow of air through the cabin, and preferably the outflow from it. Such pressure control is effected by varying the communication of conduit 35 with a duct 55' in the body of the control mechanism 9 which opens to a relatively high pressure region, such as the aircraft cabin, and a conduit 38' communicating with a relatively low pressure region, such as the atmosphere.

The absolute pressure control device 40' incorporates evacuated bellows 5', the exterior of which is subjected to cabin air pressure by way of duct 50'. Spring 51' tends to maintain the bellows expanded against the collapsing action of such pressure, and expansion of the bellows will effect movement of the movable head 52' to the left as seen in Figure 2. Such movement will reciprocate pin 54' carried by the head to project its tip into the passage 90 communicating between the low pressure duct 38' and the static air pressure conduit 35.

The tip of pin 54' is of a length such that when its end moves into passage 90 communication will be established between cabin air pressure duct 55' and conduit 35 past a reduced portion of the pin. The increase in pressure thus induced in conduit 35 will result in the outflow valve 10 being moved towards closed position, as has been explained in connection with the mechanism shown in Figure 1, thus effecting a supercharged condition of the cabin.

The differential pressure control unit 41' in this instance includes a diaphragm 6' as its pressure sensitive element, instead of a bellows such as shown in the control unit 41 of Figure 1, but the operation is the same. In addition this unit includes the compression spring 64' reacting directly between the diaphragm 6' and a supporting plate the position of which is adjustable by rotation of screw 65'. Air is admitted from the atmosphere to chamber 61' containing the spring 64' by way of the conduit 39'. The opposite side of diaphragm 6' is exposed to cabin air pressure admitted to chamber 62' through the port 63'.

The operation of the differential pressure control unit 41' is essentially the same as that of unit 41 shown in Figure 1. When the pressure difference between the aircraft cabin air pressure and atmospheric pressure tends to increase above a predetermined safe differential, diaphragm 6' will be deflected by the differential of cabin air pressure over atmospheric pressure acting on it against the pressure of spring 64' to withdraw pin 66', carried by such diaphragm, from passage 91. Communication established through such passage between conduit 38' and the entrance chamber to conduit 35 will withdraw from the latter air entering it from passage 55' to reduce the pressure in the static air pressure conduit 35, and consequently in chamber 32 of the booster control mechanism. By the change in pressure differential acting on diaphragm 30 as a result of such drop in pressure in static air pressure chamber 32 the valve 10 will be opened sufficiently to prevent the critical differential of cabin air pressure over atmospheric pressure being exceeded as ascent of the aircraft continues.

From the foregoing description of two typical embodiments of our pressure regulating control mechanism it will be seen that while air may flow continually from a high pressure region, such as the aircraft cabin, through the control mechanism to a relatively low pressure region, such as atmosphere, no continuous flow of air occurs through conduit 35 interconnecting the pressure pattern control mechanism and the booster control mechanism controlling the pneumatic valve actuating servomotor. On the contrary, only sufficient flow into or out of such conduit occurs momentarily to effect an adjustment in static pressure in chamber 32. The pressure pattern control mechanism may regulate the static pressure of air in chamber 32 of the booster control mechanism with substantially equal accuracy and promptness, therefore, whether conduit 35 be of large or small diameter, and irrespective of its length.

It will be evident that the valve 10 and its actuating mechanism, including the booster control mechanism, may be located in any portion of the aircraft even though it be remote from the pilot's and engineer's stations. The pressure pattern control mechanism incorporating the several pressure pattern units may, on the contrary, be located within easy reach of the pilot or engineering officer of the aircraft, so that adjustments in the several units, for the purpose of varying the pattern according to which the pressure of air in the cabin is controlled, may be effected readily.

We claim as our invention:

1. Mechanism for controlling the air pressure within an aircraft cabin to which air is supplied under pressure, comprising means for controlling the flow of air through the cabin, actuating means governed by the pressure of static air acting thereon, and operable to actuate said flow controlling means to regulate the flow of air through the cabin, and control mechanism including a base block having three passages therein, a first passage communicating with said actuating means, a second passage communicating with a region at a relatively low pressure and disposed adjacent and parallel to said first passage, and the third passage communicating with a region at a relatively high pressure and adapted to communicate with said first passage, a plurality of valve means mounted to reciprocate in generally parallel paths transversely of and through said first and second passages and operable to vary the communication of said first passage with said second passage for increasing or decreasing the pressure in said first passage which acts on said actuating means for controlling the actuation thereby of said flow controlling means, and a plurality of individual pressure-controlling means operatively connected, respectively, to said plurality of valve means and operable to effect independent movement of said respective valve means.

2. Mechanism for controlling the air pressure within an aircraft cabin to which air is supplied under pressure, comprising means for controlling the flow of air through the cabin, actuating means governed by the pressure of static air acting thereon, and operable to actuate said flow controlling means to regulate the flow of air through the cabin, and control mechanism including a base member having three passages therein, a first passage communicating with said actuating means, a second passage communicating with a region at a relatively low pressure and disposed adjacent and parallel to said first passage and the third passage communicating with a region at a relatively high pressure and adopted to communicate with said first passage, a plurality of independent valves mounted to reciprocate in generally parallel paths transversely of and through said first and second passages and each operable to vary the communication of said first passage with said second passage for increasing or decreasing the pressure in said first passage which acts on said actuating means for controlling the actuation thereby of said flow controlling means, and a plurality of pressure pattern control units, all communicating with the cabin, each operatively connected to a different one of said valves and each operable automatically to effect movement of its valve independently of movement of the other valves, certain of said pressure pattern control units thereby being operable to override others of said units by increasing communication between said first and second passages to effect a decrease in the pressure in said actuating means passage, for producing a decrease in cabin air pressure.

3. Mechanism as defined in claim 2, in which the plurality of pressure pattern control units include an absolute pressure control unit sensitive to the cabin air pressure and a differential pressure control unit sensitive to cabin air pressure and to atmospheric pressure and operable to override said absolute pressure control unit.

4. Mechanism as defined in claim 3, in which the differential pressure control unit is of the constant differential pressure type, and a ratio control unit also communicating with the cabin air pressure and atmospheric pressure, and operable to override both the absolute pressure control unit and the constant differential pressure control unit.

5. Mechanism as defined in claim 2, in which the plurality of pressure pattern control units include a pressure differential control unit communicating with the cabin air pressure and with atmospheric pressure, and a rate-of-pressure-change control unit having restricted communication with the cabin air pressure and operable to vary both the communication between the first passage and the second passage and between the first passage and a region at a relatively high pressure.

6. Mechanism for controlling the air pressure within an aircraft cabin to which air is supplied under pressure, comprising outlet controlling means for controlling the size of outlet through which air flows from the cabin, pneumatic servomotor means operable to shift said outlet controlling means for varying the size of outlet, valve means operable to vary the differential pressure acting on said servomotor and spring-urged in a direction to increase the pressure differential acting on the servomotor, and thereby to effect shifting of said outlet controlling means to increase the size of outlet, static air pressure responsive booster control mechanism including means operable to exert a valve-closing force on said valve means acting in opposition to its spring, and producing thereon a greater valve closing force in response to an increase in static air pressure in said booster control mechanism, a static air pressure adjusting conduit communicating with said booster control mechanism, and pressure pattern control mechanism communicating with said conduit and operable to vary the static air pressure therein and consequently in said booster control mechanism to effect operation of such servomotor thereby for shifting said outlet controlling means to effect control of the air pressure within the aircraft cabin in accordance with the pressure pattern determined by said pressure pattern control mechanism.

CARLO O. HERRALA.
ALFRED B. JEPSON.

(References on following page)

REFERENCES CITED

The following references are of record in the file of this patent:

UNITED STATES PATENTS

| Number | Name | Date |
|---|---|---|
| 2,307,199 | Cooper | Jan. 5, 1943 |
| 2,342,220 | Price | Feb. 22, 1944 |
| 2,396,116 | Noxon | Mar. 5, 1946 |
| 2,407,258 | Del Mar | Sept. 10, 1946 |
| 2,413,027 | Maxson | Dec. 24, 1946 |
| 2,419,707 | Cooper et al. | Apr. 29, 1947 |
| 2,425,000 | Paget | Aug. 5, 1947 |
| 2,441,088 | Teague | May 4, 1948 |
| 2,441,592 | Paget | May 18, 1948 |
| 2,445,183 | Orlob | July 13, 1948 |